US010814546B2

(12) United States Patent
Chen et al.

(10) Patent No.: US 10,814,546 B2
(45) Date of Patent: Oct. 27, 2020

(54) LINEAR-IMMERSED SWEEPING ACCUMULATION FOR 3D PRINTING

(71) Applicant: University of Southern California, Los Angeles, CA (US)

(72) Inventors: Yong Chen, La Canada, CA (US); Huachao Mao, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 698 days.

(21) Appl. No.: 15/099,404

(22) Filed: Apr. 14, 2016

(65) Prior Publication Data

US 2016/0303805 A1     Oct. 20, 2016

Related U.S. Application Data

(60) Provisional application No. 62/147,986, filed on Apr. 15, 2015.

(51) Int. Cl.
| | |
|---|---|
| *B29C 64/268* | (2017.01) |
| *B29C 64/135* | (2017.01) |
| *G06K 15/12* | (2006.01) |
| *H04N 1/024* | (2006.01) |
| *G02B 26/10* | (2006.01) |

(Continued)

(52) U.S. Cl.
CPC .......... *B29C 64/135* (2017.08); *B29C 64/241* (2017.08); *B29C 64/268* (2017.08); *G02B 26/105* (2013.01); *G06K 15/1295* (2013.01); *H04N 1/02409* (2013.01);

(Continued)

(58) Field of Classification Search
None
See application file for complete search history.

(56) References Cited

U.S. PATENT DOCUMENTS 4,268,111 A * 5/1981 Green ................... G02B 23/18
359/408
4,801,477 A * 1/1989 Fudim .................. G03F 7/0037
264/401

(Continued)

FOREIGN PATENT DOCUMENTS

| GB | 190323760 A | * | 12/1903 | |
| GB | 2223603 A | * | 4/1990 | ............. G02B 23/18 |

OTHER PUBLICATIONS

Speed Enforcement / Measurement:https://www.lasertech.com/Speed-Enforcement-Measurement.aspx retrieved online at Feb. 28, 2019 (Year: 2019).*

(Continued)

*Primary Examiner* — Seyed Masoud Malekzadeh
*Assistant Examiner* — Manley L Cummins, IV
(74) *Attorney, Agent, or Firm* — Snell & Wilmer LLP

(57) ABSTRACT

The present disclosure describes systems and techniques relating to computer numerical control (CNC) additive manufacturing. According to an aspect, a tooltip for an additive manufacturing machine includes: an input end configured to receive light from an optical system; and an output end configured to deliver the light to a workpiece on a build platform in the additive manufacturing machine; wherein the output end of the tooltip is configured to be immersed in a liquid resin in a tank of the additive manufacturing machine, and the output end defines a linear opening through which the light is delivered to the workpiece on the build platform.

29 Claims, 7 Drawing Sheets

(51) Int. Cl.
  *B29C 64/241* (2017.01)
  *B33Y 30/00* (2015.01)
  *B33Y 40/00* (2020.01)
(52) U.S. Cl.
  CPC ............... *B33Y 30/00* (2014.12); *B33Y 40/00* (2014.12); *G06K 2215/0082* (2013.01)

(56) References Cited

U.S. PATENT DOCUMENTS

| | | | | | |
|---|---|---|---|---|---|
| 5,886,839 | A | * | 3/1999 | Arnone | A63B 33/00 359/857 |
| 2002/0164069 | A1 | * | 11/2002 | Nagano | B29C 64/129 382/154 |
| 2013/0037993 | A1 | * | 2/2013 | Chen | B29B 13/08 264/401 |
| 2014/0306380 | A1 | * | 10/2014 | El-Siblani | B33Y 10/00 264/401 |

OTHER PUBLICATIONS

Huachao Mao, Chi Zhou, Yong Chen, "LISA: Linear Immersed Sweeping Accumulation." SME Journal of Manufacturing Processes, 24, p. 406-415, 2016 (Year: 2016).*

Chen et al., "A Layerless Additive Manufacturing Process based on CNC Accumulation", Rapid Prototyping Journal, 2011; 17(3): 218-227.

Chakraborty et al., "Extruder path generation for Curved Layer Fused Deposition Modeling", Computer-Aided Design, 40 (2008): 235-243.

Elber et al., "5-Axis Freeform Surface Milling using Piecewise Ruled Surface Approximation", Journal of Manufacturing Science and Engineering 119(3): 383-387, Aug. 1, 1997.

Formlab, http://formlabs.com/products/3d-printers/form-1-plus/, 2016.

Han et al., "Tool Path-Based Deposition Planning in Fused Deposition Processes", Journal of Manufacturing Science and Engineering; 124(2): 462-472, May 2002.

Lasemi et al., "Recent development in CNC machining of freeform surfaces: A state-of-the-art review", Computer-Aided Design 42 (2010) 641-654.

Lee et al., "Development of a hybrid rapid prototyping system using low-cost fused deposition modeling and five-axis machining", Journal of Materials Processing Technology 214 (2014) 2366-2374.

Liao et al., "Development of a high precision tabletop versatile CNC wire-EDM for making intricate micro parts", Journal of Micromechanics and Microengineering 15 (2005) 245-253.

Lin et al., "Efficient Tool-Path Planning for Machining Free-Form Surfaces", Journal of Manufacturing Science and Engineering, vol. 118, Feb. 20-28, 1996.

Ma et al., "NURBS-based adaptive slicing for efficient rapid prototyping", Computer-Aided Design 36 (2004) 1309-1325.

Melchels et al., "A review on stereolithography and its applications in biomedical engineering", Biomaterials, 31(24), pp. 6121-6130, 2010.

Pan et al., "Smooth surface fabrication in mask projection based stereolithography", Journal of Manufacturing Processes 14 (2012) 460-470.

Pan et al., "A Fast Mask Projection Stereolithography Process for Fabricating Digital Models in Minutes", Journal of Manufacturing Science and Engineering, vol. 134, Oct. 2012, 9 pages.

Pan et al., "Multi-tool and Multi-axis CNC Accumulation for Fabricating Conformal Features on Curved Surfaces", Journal of Manufacturing Science and Engineering, 2014; 136(3): a2031007.

Rippmann et al., "New Design and Fabrication Methods for Freeform Stone Vaults based on Ruled Surfaces", Computational Design Modelling, Berlin, Springer, 2012, pp. 181-189.

Senatore et al., "Analysis of improved positioning in five-axis ruled surface milling using envelope surface", Computer-aided Design 37 (2005) 989-998.

Siegman, A.E., "How to (Maybe) Measure Laser Beam Quality", Optical Society of America Annual Meeting, Long Beach, California, Oct. 1997, pp. 1-18.

Song et al., "Development of a Low-cost Parallel Kinematic Machine for Multi-directional Additive Manufacturing", Journal of Manufacturing Science and Engineering, 2015; 2(127); a2021005.

Thrimurthulu et al., "Optimum part deposition orientation in fused deposition modeling", International Journal of Machine Tools & Manufacture 44 (2004) 585-594.

Tumbleston et al., "Continuous liquid interface production of 3D objects", Science, vol. 347, Issue 6228, pp. 1349-1352, Mar. 20, 2015.

Wang, et al., "Solid modeling of polyhedral objects by Layered Depth-Normal Images on the GPU", Computer-Aided Design 42 (2010) 535-544.

Xu et al., "Mask Image Planning for Deformation Control in Projection-Based Stereolithography Process", Journal of Manufacturing Science and Engineering vol. 137, Jun. 2015, 12 pages.

Yang et al., "Fractal scanning path generation and control system for selective laser sintering (SLS)", International Journal of Machine Tools & Manufacture 43 (2003) 293-300.

Zhou et al., "Digital Material Fabrication Using Mask-Image-Projection-based Stereolithography", Rapid Prototyping Journal, 2013; 3(19): 153-165.

Zhou et al., "Optimized Mask Image Projection for Solid Freeform Fabrication", Journal of Manufacturing Science and Engineering, 2009; 6(131): a2061004.

* cited by examiner

US 10,814,546 B2

LINEAR-IMMERSED SWEEPING ACCUMULATION FOR 3D PRINTING

CROSS REFERENCE TO RELATED APPLICATIONS

This application claims priority to U.S. Provisional Application Ser. No. 62/147,986, entitled "LINEAR-IMMERSED SWEEPING ACCUMULATION (LISA): A LOW-COST AND FAST 3D PRINTING PROCESS", filed Apr. 15, 2015. In addition, this application is related to US Patent Pub. No. 2013/0037993, entitled "COMPUTER NUMERICAL CONTROL (CNC) ADDITIVE MANUFACTURING", filed Aug. 9, 2012, and published on Feb. 14, 2013. Both of these prior applications are hereby incorporated by reference.

BACKGROUND

The present disclosure describes systems and techniques relating to computer numerical control (CNC) manufacturing in general, and, more particularly, to CNC additive manufacturing.

Many current additive manufacturing (AM) processes are layer-based. By converting a three-dimensional model into two-dimensional layers, the process planning can be dramatically simplified. In addition, US Patent Pub. No. 2013/0037993 describes an additive manufacturing system and process in which a fiber optic cable can be connected with an ultraviolet (UV) Light Emmitting Diode (LED) and related lens to form an accumulation tool. The cable can then be merged inside a tank filled with liquid resin that is LTV-curable. By controlling the on/off state of the UV-LED and the multi-axis motion of the cable, a physical model, having a desired shape, can be built by selectively curing liquid resin into solid.

SUMMARY

The present disclosure describes systems and techniques relating to computer numerical control (CNC) additive manufacturing, and in particular, to a three dimensional (3D) printer based on a line-based CNC accumulation process, which can achieve both low cost and high speed.

In some implementations, a tooltip for an additive manufacturing machine includes: an input end configured to receive light from an optical system; and an output end configured to deliver the light to a workpiece on a build platform in the additive manufacturing machine; wherein the output end of the tooltip is configured to be immersed in a liquid resin in a tank of the additive manufacturing machine, and the output end defines a linear opening through which the light is delivered to the workpiece on the build platform.

The light used in the tooltip can include focused laser light having a laser spot size, and a width of the linear opening through which the light is delivered to the workpiece can be smaller than the laser spot size. The output end of the tooltip can be covered at least in part with a coating that reduces attachment force between the output end of the tooltip and material cured by light emitted from the output end of the tooltip, and the coating can cover the linear opening through which the light is delivered to the workpiece. In addition, the coating can include: a sealing film that covers a first side of the output end of the tooltip, a second side of the output end of the tooltip, and the linear opening between the first side and the second side; and a Teflon film that covers the sealing film.

The linear opening through which the light is delivered to the workpiece can have a length of between 5 and 100 mm, and a width of between 0.05 and 2.5 mm. The output end of the tooltip can include a first side and a second side, and the first side can be vertically longer than the second side, thereby creating an angled curing region along the linear opening. The angled curing region along the linear opening can have an angle between five and twenty degrees with respect to a horizontal plane. Moreover, the output end of the tooltip can include a transparent material that fills the linear opening through which the light is delivered to the workpiece.

In some implementations, a computer program product, encoded on a computer-readable medium, is operable to cause data processing apparatus to perform operations including: moving a tooltip to immerse an output end of the tooltip in a liquid resin in a tank of an additive manufacturing system, wherein the output end defines a linear opening through which light is delivered to a workpiece on a build platform in the tank of the additive manufacturing system; and causing light to be delivered through the linear opening of the output end of the tooltip in a set of distinct lines to cure linear portions of the liquid resin in the tank to manufacture the workpiece on the build platform.

The light can be laser light, and the operations can include changing positions of two laser scan end points using a first gyro mirror and a second gyro mirror to adjust a position of a laser scan beam line provided to the tooltip. The operations can include selectively delivering the laser light during a single scan along the linear opening through which the light is delivered to the workpiece. The operations can include varying scanning patterns to improve mechanical strength of the workpiece. Moreover, varying the scanning patterns can include rotating a main scan line pattern orientation between building a first layer and a second layer of the workpiece.

In some implementations, a system for additive manufacturing includes: a tank configured to contain a build platform and a liquid resin; a multi-axis motion control stage in proximity to the tank; a scanning unit coupled with the multi-axis motion control stage, wherein the scanning unit includes an optical system and a tooltip, the optical system being configured to supply light to the tooltip, and the tooltip including an input end to receive the light and an output end to deliver the light to a workpiece on the build platform, wherein the output end of the tooltip is configured to be immersed in the liquid resin in the tank, and the output end defines a linear opening through which the light is delivered to the workpiece on the build platform; and a computer control system including at least one hardware processor and a storage device coupled with the hardware processor, the computer control system being coupled with the multi-axis motion control stage to control movement of the scanning unit, and the storage device encoding a program configured to cause the computer control system to move the scanning unit to immerse the output end of the tooltip in the liquid resin in the tank and to deliver light in a set of distinct lines to cure linear portions of the liquid resin in the tank to manufacture the workpiece on the build platform.

The optical system can include: a lens to focus laser light received from a laser light source; and a gyro mirror to direct the focused laser light into the tooltip. The lens can include more than one lens, and the gyro mirror can include: a first gyro mirror to direct the focused laser light in a first direction rotated about a first axis; and a second gyro mirror to direct the focused laser light in a second direction rotated about a second axis; wherein the first axis of rotation is different than the second axis of rotation. Moreover, the program can be configured to cause the computer control system to change positions of two laser scan end points using the first gyro mirror and the second gyro mirror to adjust a position of a laser scan beam line provided to the laser tooltip.

The program can be configured to cause the computer control system to selectively deliver the laser light from the laser light source during a single scan along the linear opening through which the light is delivered to the workpiece. The laser light source can include a fiber optic waveguide coupled with a laser. Furthermore, the tooltip in the system can include features of the tooltip noted above.

The system can include multiple scanning units coupled with the multi-axis motion control stage, each of the multiple scanning units including another of the laser optical system and the laser tooltip. The multi-axis motion control stage can provides more than 3 axes of motion. The program can be configured to cause the computer control system to vary scanning patterns of the scanning unit to improve mechanical strength of the workpiece. In some implementations, the multi-axis motion control stage includes a rotation stage coupled with the build platform and configured to rotate the build platform in the tank, and the program is configured to cause the computer control system to vary the scanning patterns by rotating the build platform between building a first layer and a second layer of the workpiece.

In various implementations, one or more of the following features and advantages can be provided. A line-based CNC accumulation process can be significantly faster than prior approaches, e.g., 10× faster than the filament-extrusion-based 3D printing processes that are popular in the market. Similar to 3D Systems's stereolithographic (SLA) and Formlab's Form1 machines, the present process can use a laser and a gyro-mirror; however, a curing tool may be merged inside a resin tank and moved from one end to another. Hence the built segment of a layer may be detached from the curing tool during the building process. This may significantly reduce the building time since the difficulty of separating a built layer from the bottom of the resin tank has been avoided. More importantly, the present process may build much larger part sizes when compared to the laser-based SLA process. By incorporating 5-axis (or more) CNC motion and line-based material deposition, the process can fabricate a 3D object with large fabrication volume and use a non-layer-based fabrication approach. Finally, the present 3D printing process, based on a line-based computer numerical control (CNC) accumulation process, may achieve both low cost and high speed, with significant advantages over existing printing technologies available on the market.

The above and other aspects and embodiments are described in greater detail in the drawings, the description and the claims.

DESCRIPTION OF DRAWINGS

Like reference numbers and designations in the various drawings indicate like elements.

DETAILED DESCRIPTION

Figure 1A:
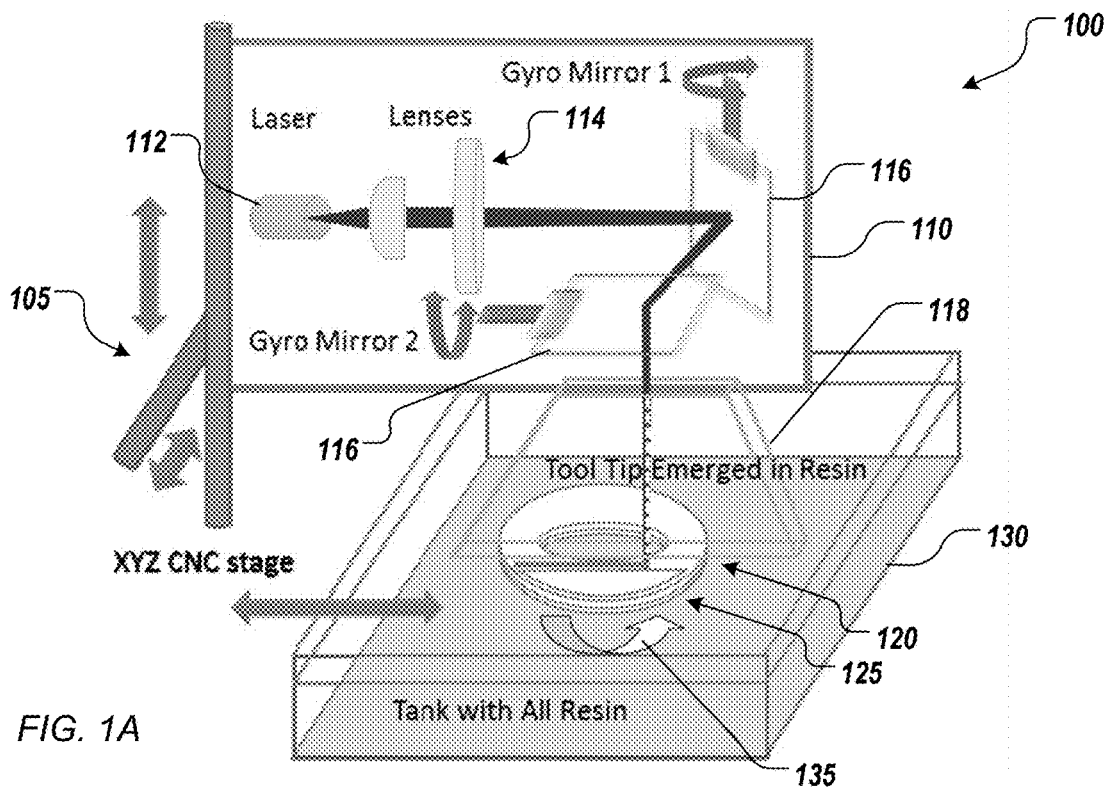
FIGS. 1A & 1B are block diagrams showing examples of a CNC accumulation scheme in a 3D printer.

Illustrative embodiments are now discussed and illustrated. Other embodiments may be used in addition or instead. Details which may be apparent or unnecessary may be omitted to save space or for a more effective presentation. Conversely, some embodiments may be practiced without all of the details which are disclosed.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification are approximate, not exact. They are intended to have a reasonable range which is consistent with the functions to which they relate and with what is customary in the art to which they pertain. In addition, all articles, patents, patent applications, and other publications which have been cited are hereby incorporated herein by reference.

In this disclosure, a line-based CNC accumulation process is introduced, which can be 20× faster than a previous approach and also can be 10× faster than the filament-extrusion-based 3D printing processes that are popular in the market. Similar to the 3D Systems's SLA and Formlab's Form1 machines, the process can use a laser and a gyro-mirror; however, the curing tool is merged inside a resin tank, and the curing tool is moved from one-end to another. Hence the built segment of a layer will be detached from the curing tool during the building process. This can significantly reduce the building time since the difficulty of separating a built layer from the bottom of the resin tank has been avoided. More importantly, the process can build much larger part sizes when compared to the laser-based SLA process.

Further, compared to EnvisionTec's 3SP (Scan, Spin, and Selectively Photocure) process, a gyro-mirror can be used that is easier to control. More importantly, the line-based tool is merged inside a resin tank. Hence the speed can be much faster by removing the need of the recoating process. The speed of the disclosed line-based CNC accumulation process can be similar to the speed of the digital-light-projection-based SLA processes that is getting popular in recent years (e.g., 3D Systems's Projet, Autodesk's Fusion, etc.). However, a low-cost laser and a gyro-mirror (<$50) can be used in the present system, which is 10× cheaper than the Digital Light Projection (DLP) projector based on a Digital Micromirror Device (DMD) chip from Texas Instrument (>$400). Moreover, the process can be made much faster by combining multiple scanning units. In addition, the process can be extended to other UV light source such as 365 nm, which is difficult for Texas Instrument's DMD chips.

The present technology disclosure describes a line-based CNC accumulation process, including the basic idea, the hardware development, and the software implementation. A low-cost 3D printer built by integrating a laser scan system and a 3-axis CNC stage has been demonstrated. A novel laser optical tooltip is designed for the CNC accumulation process that is built under resin.

FIG. 1A shows an example of a CNC accumulation scheme in a 3D printer. An additive manufacturing system 100 includes a multi-axis motion control stage 105 in proximity to a tank 130 with light curable resin therein. The multi-axis motion control stage 105 can be an XYZ CNC stage, as shown, or one or more motion control stages with three, four, five or six degrees of freedom. Note that additional degrees of freedom can be provided by the tank 130, which can include a rotation stage 135 coupled with the build platform so as to rotate the build platform in the tank. Note that the rotation stage 135 can provide one, two, or three degrees of rotation freedom, and the rotation stage 135 can be designed to rotate the build platform, the tank, or both. In any case, the rotation stage 135 allows the built platform and built layers to be rotated relative to the scanning tool. In addition to more complex scanning paths, the scanning patterns can be varied by rotating the platform a certain angle (e.g., 30°) after each layer. This can significantly improve the mechanical property of the built part, as described in further detail below.

The multi-axis motion control stage 105 is coupled with a tooltip 118 that is merged inside the resin tank 130. In the example shown, the tooltip 118 is a laser tooltip 118 that attaches with a laser optical system to form a scanning unit 110. Various types of laser optical systems can be used to deliver linear laser light to the tooltip 118. In the example shown, the laser optical system includes a laser 112 (e.g., a high power laser diode), lenses 114 (e.g., a collimated lens and a convex lens used to focus the laser beam into a small spot), and first and second gyro mirrors 116. Use of a two-axis gyro-mirror system, as shown, can facilitate operation of the 3D printer. However, in other implementations, only a single gyro mirror 116 is used, or another approach can be taken to deliver laser light in a line. For example, a cylinder lens, prism or other optical component can be used to fan out the laser beam, or rotating polygon mirror laser scanning systems and techniques can be used. In addition, in some implementations, the laser 112 need not be included in the scanning unit 110, but rather a laser light source within the scanning unit 110 can be a fiber optic waveguide coupled with a laser located elsewhere.

Figure 1B:
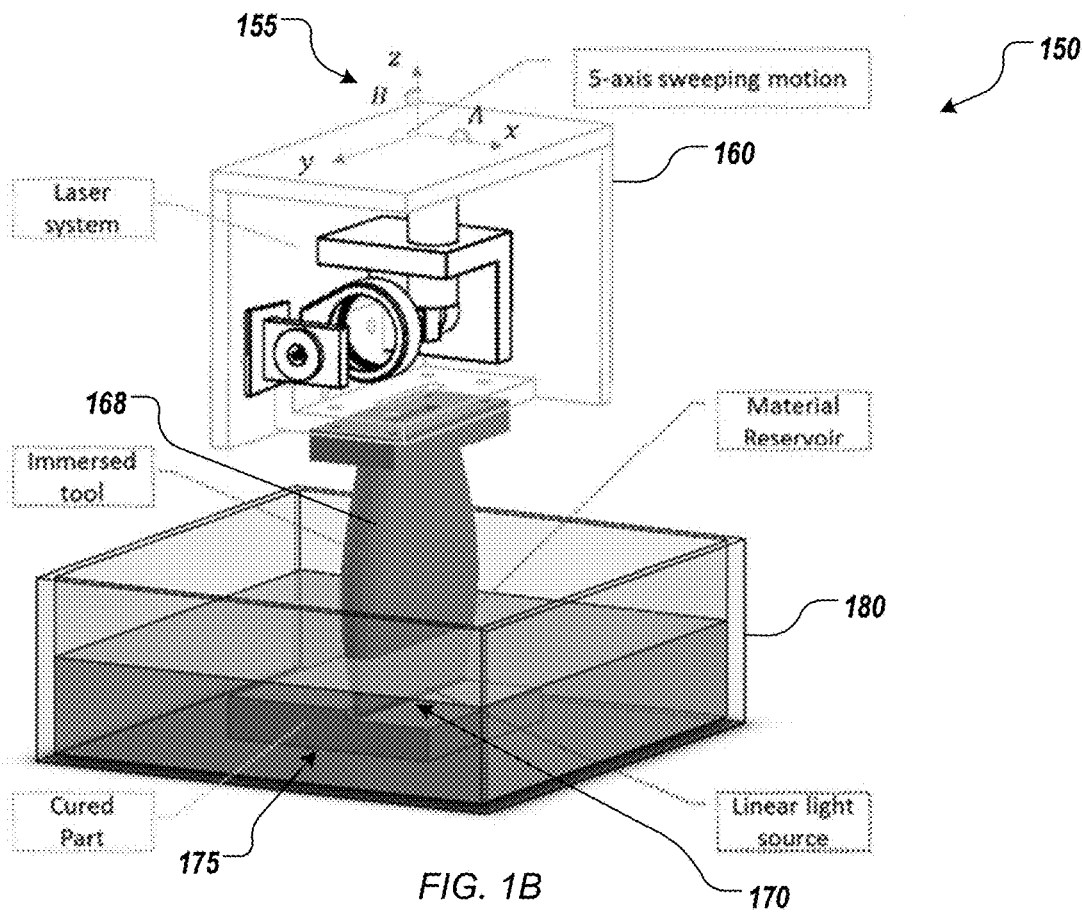

FIG. 1B shows another example of a CNC accumulation scheme in a 3D printer. An additive manufacturing system 150 includes a multi-axis motion control stage 155 in proximity to a material reservoir (tank) 180. In this example the motion control stage 155 provides 5-axis sweeping motion, with translation along X, Y and Z dimensions, and with rotations A and B about the X axis and the Z axis, respectively. Other implementations can include both XYZ linear motions and ABC rotations. Further, a scanning unit 160 contains a laser system that delivers laser light to an immersed tool 168. In both of the examples of FIGS. 1A & 1B, the motion control stage 105, 155 can be used to control the spatial motion of a laser tooltip 118, 168 that is merged inside a resin tank 130, 180. The laser tooltip 118, 168 can quickly scan 1-axis line 120, 170 from a powerful UV laser (e.g., 0.2-2 W) for selectively curing liquid resin into solid to form a workpiece 125, 175 (a cured part) within the tank 130, 180. Thus, the system is used to dynamically scan line segments to build up the workpiece.

Figure 2:
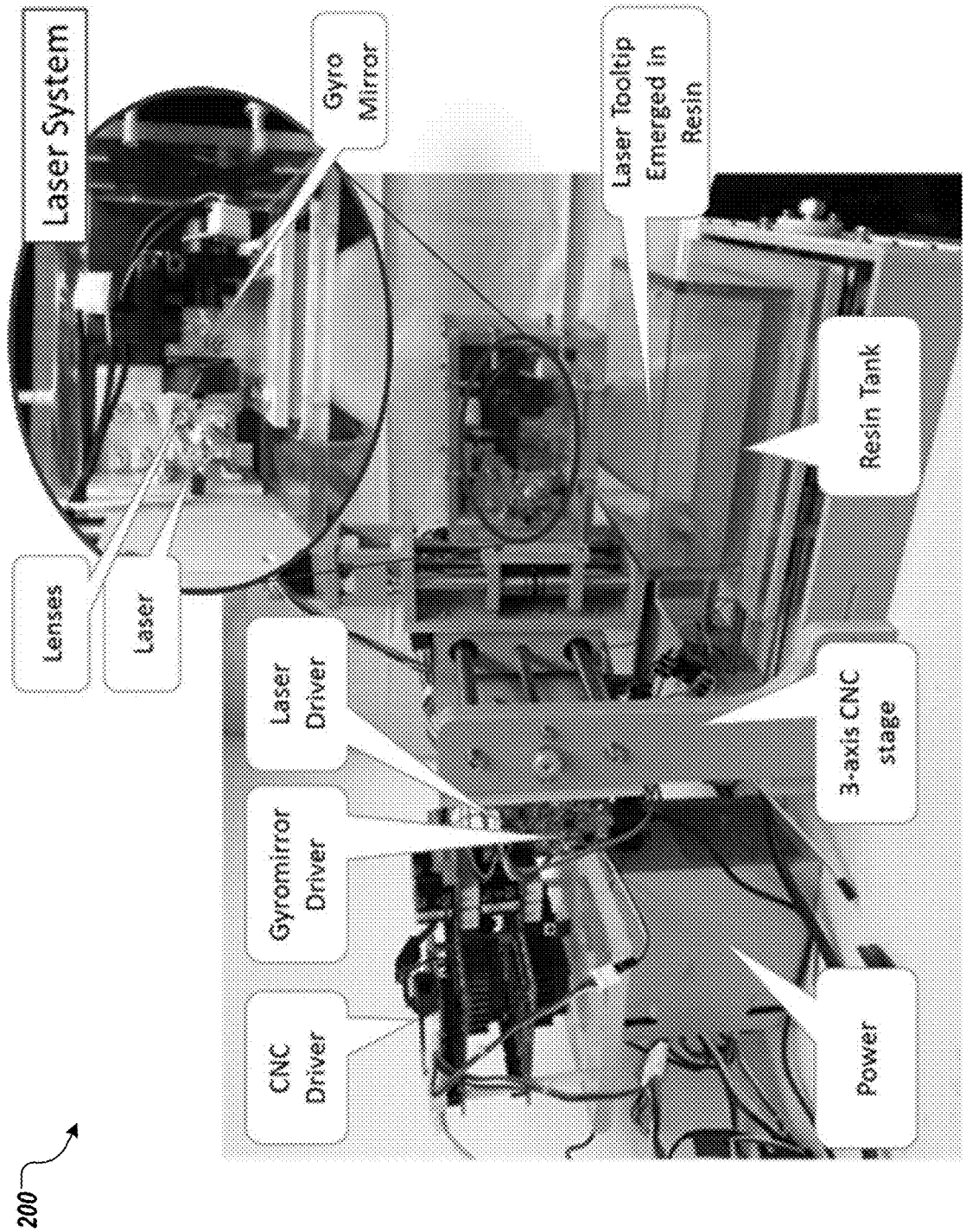
FIG. 2 shows a prototype physical system corresponding to FIG. 1A.

FIG. 2 shows a prototype physical system 200 corresponding to FIG. 1A. In this example, the system 200 includes a computer control system that is composed of a power source, a CNC driver programmed to operate the 3-axis CNC stage, a gyro mirror driver programmed to operate gyro mirror(s) inside the laser system of the scanning unit, and a laser driver programmed to operate the laser inside the laser system of the scanning unit to turn on and off the laser light that is focused through the lenses and redirected by the gyro mirror(s) into the laser tooltip that is emerged in the resin in the tank. In the example of FIG. 2, the laser optical system components have the following parameters:

| component | Key Parameters | Description |
| --- | --- | --- |
| Laser | P = 400 mw | Cure power |
| Laser | λ = 405 | Wavelength |
| Collimated Lens | F = 150 mm | Focus laser spot |
| Gyro mirror | Resolution = 0.0035°<br>Or 0.017 mm (67 mm) | Navigate laser beam to cure a line |
| Tool Tip | openings<br>width = 1.5 mm | Ensure laser beam reach any depth in resin |

The laser used is Opnext HL40023MG. Its wave length is 404 nm, and the output power is 400 mW. An adjustable current laser diode driver is applied to control the turn on/off of the laser. The on/off signal is sent by the gyro mirror driver such that the laser can be controlled corresponding to the motion of the gyro mirror. As will be appreciated, many other systems, components, and configurations can be used in various implementations. For example, a computer control system need not have separate CNC, gyro mirror, and laser drivers, as shown. In general, a computer control system includes at least one hardware processor and a storage device (e.g., volatile or non-volatile memory, such as Random Access Memory (RAM) and Flash RAM) encoding a program to cause the control system to move the tooltip and cure resin in the tank. Further, a computer control system can be implemented using integrated circuit technology, such as an integrated circuit board with embedded processor and firmware, a general purpose computer that has been programmed with software to operate the 3D printer, or both.

Figure 3A:
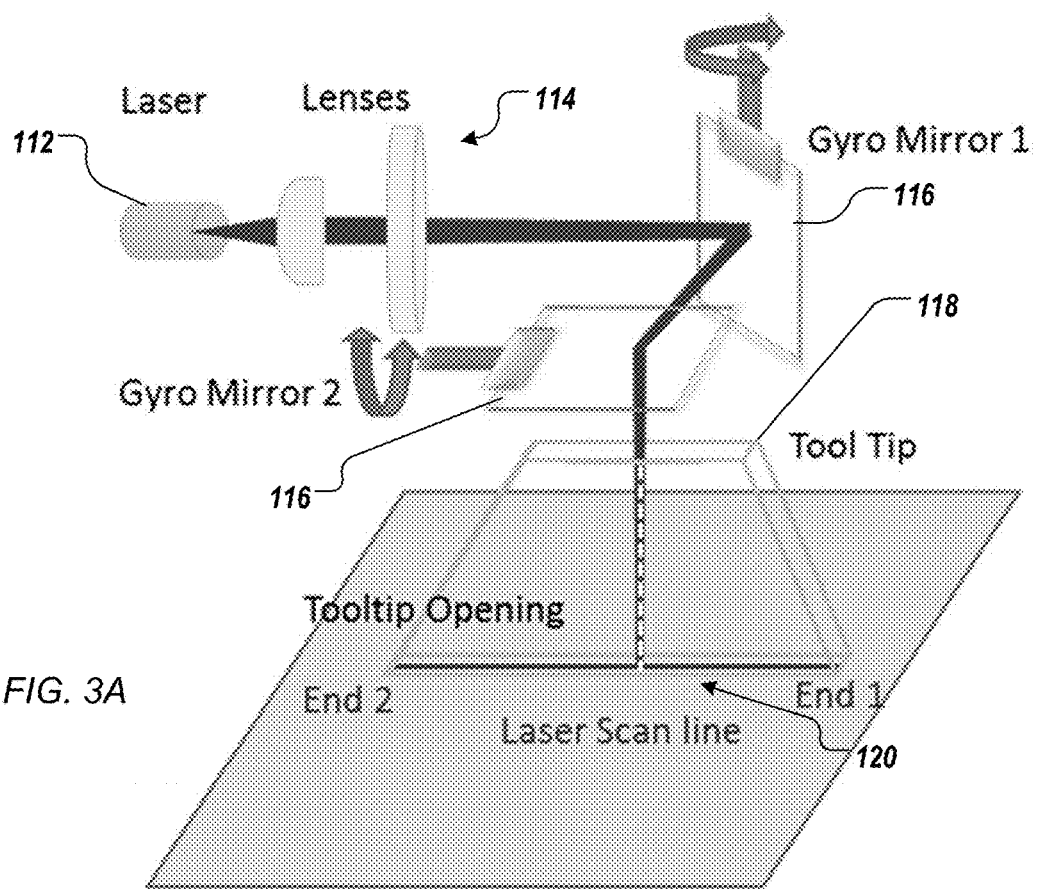
FIGS. 3A & 3B show a portion of the laser system from FIG. 1A.
Figure 3B:
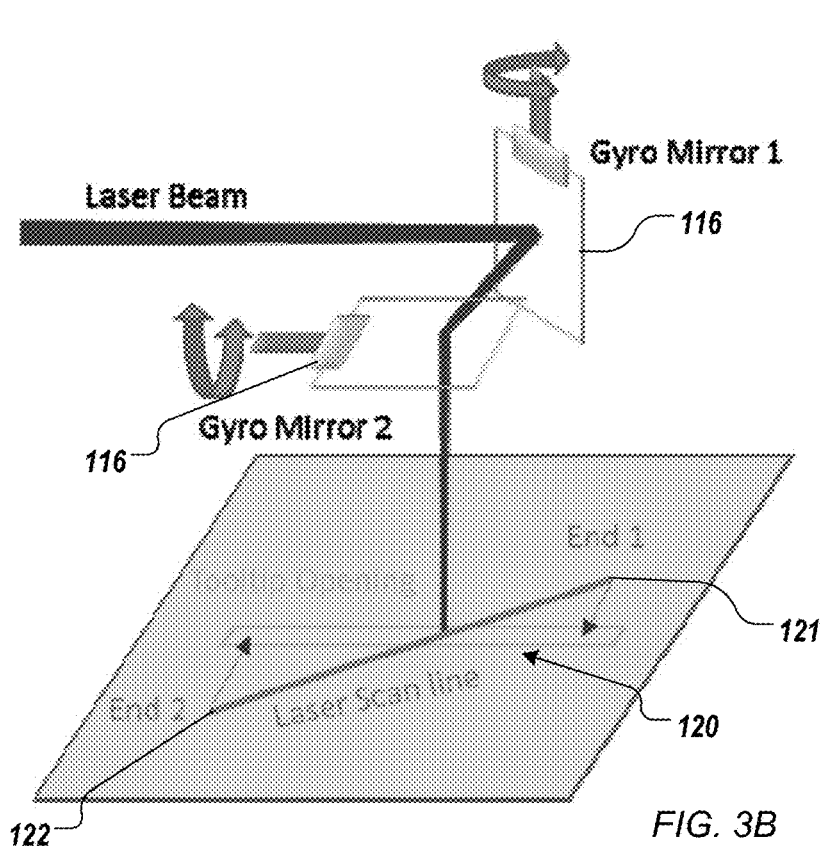

FIGS. 3A & 3B show a portion of the laser system from FIG. 1A. As shown, the tooltip 118 is introduced to protect the laser beam from the surrounding resin when it is merged inside a resin tank. In addition, the size of the opening 120 of the tooltip can be smaller (in width) than the focused laser spot size to further reduce the scanned line size that can be achieved. Factors that may influence the cured line quality include laser power, laser scan speed, focus length, and cured line length. Classical Beer Lambert's law of light propagation in absorbing media shows that the cured depth follows the following formula:

$$C_d = D_p \ln\left(\frac{E_{max}}{E_c}\right)$$

$E_{max}$ denotes the energy exposure, and $E_c$ represents the critical energy of resin.

A parabolic model was used to describe the relationship between cured depth and cured line width:

$$L_w = 2W_0\sqrt{\frac{C_d}{D_p}}$$

Where, $W_0$ is the Gaussian half-width of the laser irradiance distribution (at the $1/e^2$ point).
Also, $W_0$ is changing along the z axis, following:

$$W_x^2(z) = W_{0x}^2 + M_x^4\left(\frac{\lambda}{\pi W_{0x}}\right)^2(z-z_{0x})^2$$

$$W_y^2(z) = W_{0y}^2 + M_y^4\left(\frac{\lambda}{\pi W_{0y}}\right)^2(z-z_{0y})^2$$

The energy exposure $E_{max}$ is determined by the laser power P and scan speed v.

$$E_{max} = \frac{P}{v}$$

Combining the above equations, we have $$L_w(z) = k\sqrt{(W_0^2 + k_1(z-z_0)^2)(\ln P - \ln v + k_2)}.$$

Experiments were performed to explore the best setting for the laser scan line. These experiments resulted in the following data:

| P (v) | V (mm/s) | Z (mm) | Line width (mm) |
|---|---|---|---|
| 5.3 | 1.675 | 125 | 0.808275 |
| 5.3 | 1.675 | 115 | 1.148175 |
| 5.3 | 16.75 | 125 | 1.640325 |
| 5.3 | 16.75 | 115 | 0.869975 |
| 4.9 | 1.675 | 125 | 1.993275 |
| 4.9 | 1.675 | 115 | 2.8755 |
| 4.9 | 16.75 | 125 | 0.4022 |
| 4.9 | 16.75 | 115 | 0.310925 |
| 5.3706 | 3.045455 | 120 | 1.355725 |
| 4.8294 | 3.045455 | 120 | 0.85115 |
| 5.1 | 14.405 | 120 | 1.878475 |
| 5.1 | 0.0335 | 120 | 0.8455 |
| 5.1 | 3.045455 | 126.765 | 0.65385 |
| 5.1 | 3.045455 | 113.235 | 1.0284 |
| 5.1 | 3.045455 | 120 | 0.4879 |
| 5.1 | 3.045455 | 120 | 0.5046 |
| 5.1 | 3.045455 | 120 | 0.580725 |

Using "fitnlm" function in Matlab, we have the following fitted function:

$$L_w(z) = 0.117\sqrt{(25.62+(z-122.21)^2)(\ln P - \ln v - 0.1)}$$

The corresponding parameters are

| Parameters | Value |
|---|---|
| $k/k_1$ | 0.117 |
| $W_0^2/k_1$ | 25.62 |
| z | 122.21 |
| $k_2$ | −0.1 |

Line width compensation can be conducted as a compensation for different positions. Along the x axis direction, the equivalent height z can be modeled as:

$$h = \sqrt{z^2 + x^2}$$

Thus, given the fixed power, if we want to obtain a uniform width line, with same width as at position x=0, we should have $$L_w(z,x) = L_w(z,0)$$
$$= k\sqrt{\left(W_0^2 + k_1(\sqrt{z^2+x^2} - z_0)^2\right)(\ln P_0 - \ln v + k_2)}$$
$$= k\sqrt{W_0^2 + k_1(z-z_0)^2}(\ln P_0 - \ln v_0 + k_2)$$

That is $$v(x) = v_0 \exp\left(\frac{(\sqrt{z^2+x^2}-z_0)^2 - (z-z_0)^2}{(\sqrt{z^2+x^2}-z_0)^2 + W_0^2/k_1}(\ln P_0 - \ln v_0 + k_2)\right)$$

Also, we should consider that the motion of laser spot is controlled by the rotation of gyro mirror, i.e.

$$v(x) = \frac{z^2+x^2}{z}w(x)$$

Plugin into v(x), we have the rotation speed:

$$w(x) = w_0\frac{z^2}{z^2+x^2}\exp\left(\frac{(\sqrt{z^2+x^2}-z_0)^2 - (z-z_0)^2}{(\sqrt{z^2+x^2}-z_0)^2 + W_0^2/k_1}(\ln P_0 - \ln w_0 + k_2 - \ln z)\right)$$

This indicates that we can adjust the scan speed to obtain a uniform width. Note that, for a fixed setup, z and $z_0$ are fixed.

As noted above, using two gyro mirrors is not required in all implementations. However, using two gyro mirrors can facilitate operation of the 3D printing system due to the fine control over the position of the laser beam. Referring to FIG. 3B, note that by changing the positions 121, 122 of two laser line ends (End1 and End 2) in software, the position of a laser beam line can be readily adjusted, as desired. This kind of adjustment based on software is much easier and more efficient than by mechanical adjustment. Note that compared to the optical path (e.g., ~60 mm length) the gap is relatively small (e.g., 1 mm). Thus, it is difficult to use mechanical adjustment approaches to achieve the purpose, and so an optical adjustment approach can be adopted using a two-axis gyro-mirror system. As shown in FIGS. 3A & 3B, the position of the scanned laser line can be readily fine-tuned by changing the positions of the two ends of the laser line (i.e., End1 and End2). Using the control software of the gyro-mirror system, the position of the laser scan line can be accurately adjusted to align with the tooltip opening.

Figure 4A:
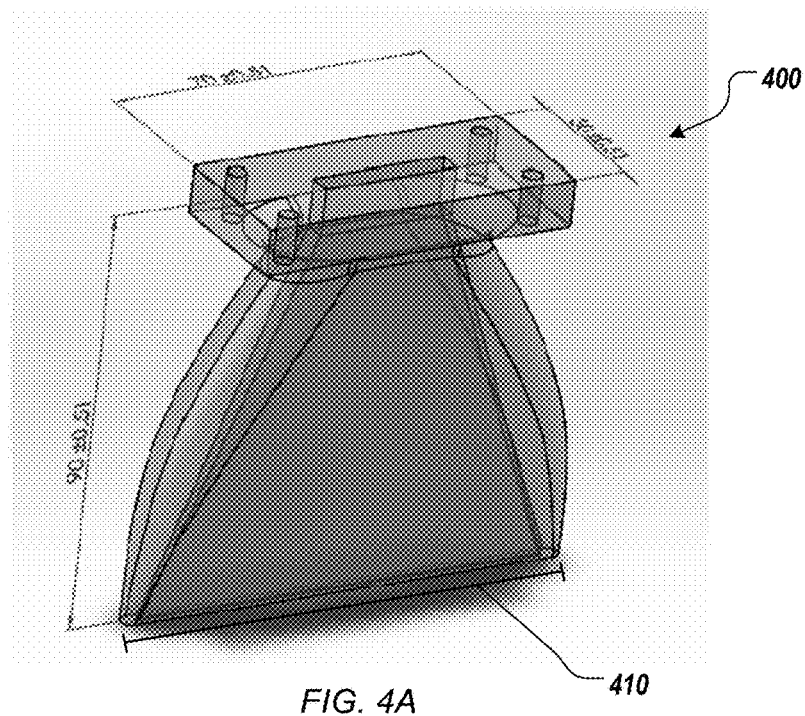
FIGS. 4A & 4B show details of an example of a laser tooltip.

In contrast with a previous CNC accumulation process that used an optical fiber, the present systems and techniques describe a new type of accumulation tool to accomplish the build task much faster. FIG. 4A shows a Computer Aided Design (CAD) model of a tooltip 400. While this example 400 represents the mechanical structure of the tooltip generally, it will be appreciated that modifications can be made, both in dimensions and materials used. In some implementations, the tooltip 400 is made of plastic, metal, or a combination of these.

In general, the tool 400 protects the light (e.g., input laser beam) from exposure to the surrounding resin when the tool 400 is immersed in the resin. In addition, the tool 400 delivers light to cure the resin through an output end that defines a linear opening through which the light is delivered to the resin. Note that the opening is linear in that a length 410 of the opening is at least twice as larger than a width of the opening. In some implementations, the length 410 of the linear opening is between 5 and 100 millimeters. Longer openings can be difficult to implement for use with a laser without losing focus. However, other implementations may achieve longer lengths 410, such as by using a prism lens to get extra length at the end of the tooltip 400.

Figure 4B:
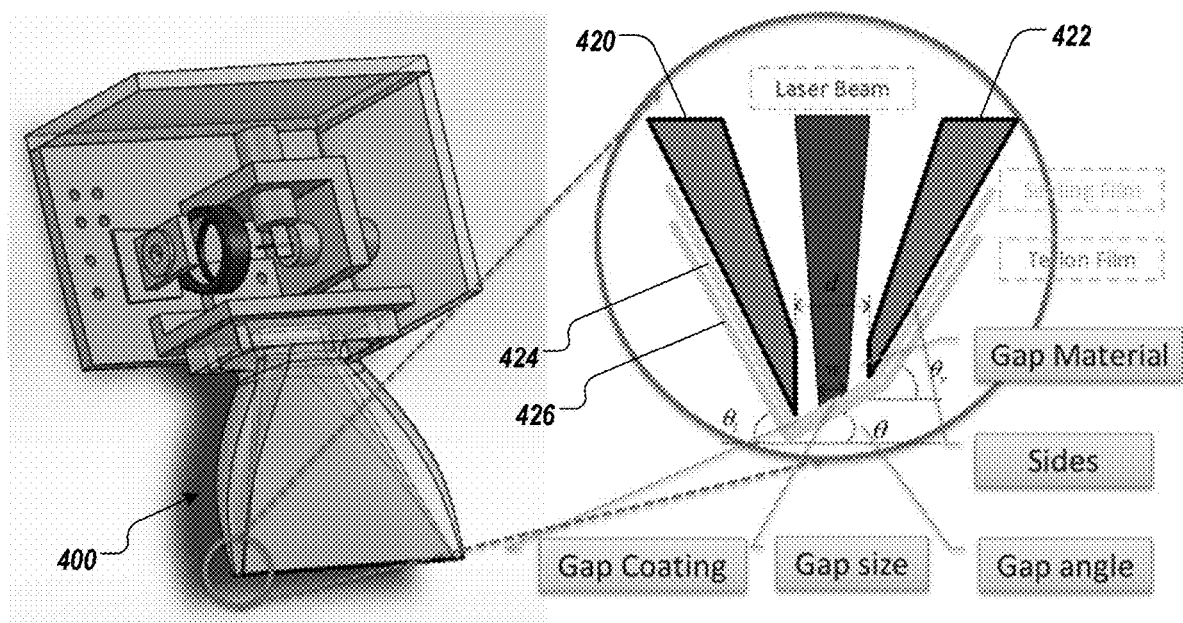

FIG. 4B shows the tool 400 attached to a laser optical system to form a scanning unit. In some implementations, a compact mechanic structure is designed (as shown) to contain the laser and laser optical system, thereby encapsulating the laser system as a moveable tool with the tooltip 400 attached. For purposes of clarity, the shield and the bracket are hidden in FIG. 4B. Also, note that the tool 400 can be removably attached, such as by using screws, bolts, or snapping connectors.

In addition, FIG. 4B shows a blow up cross section of the output end of the tool 400. As shown, a first side 420 and a second side 422 of the tooltip 400 come together at the end of the tooltip 400, but with a gap therebetween for the laser beam to pass through. In some implementations, the tooltip 400 has a narrow gap (e.g., a size varying from 0.05-0.25 mm) in its bottom. In other implementations, a wider gap can be used (e.g., a size varying from 0.25-2.5 mm). Thus, the gap size, d, can vary from 0.05 mm to 2.5 mm in various implementations.

In any case, a laser beam can pass through the opening to cure liquid resin. In some implementations, the gap is an air gap. In other implementations, a transparent gap material is included, such as glass or acrylic. In either case, the gap can be covered along with the two sides 420, 422 of the tooltip 400 with a coating that is transparent to the laser light and also reduces attachment force between the output end of the laser tooltip 400 and material cured by laser light emitted from the output end of the laser tooltip 400. In some implementations, the coating is composed of distinct thin films, where a first film 424 is a sealing film (e.g., an acrylic film or other plastic films) used to prevent any liquid resin getting inside the tooltip 400, and a second film 626 is a Teflon film used to reduce attachment force between the tool 400 and the resin that is cured at the gap. Other coatings are also possible, such as use of Teflon alone (without a separate sealing film) or PDMS (polydimethylsiloxane). All of these coatings are generally transparent to the laser beam.

Thus, the tooltip 400 is sealed and immersed in the liquid resin when fabricating a workpiece. The tooltip 400 is designed to have a sealing structure such that the laser beam will be protected and navigated to the bottom of the tool 400, and such that the resin will not fill into the tool 400. In this way, a linear light source can be realized at the tool's bottom which is immersed in the resin. Further, in addition to providing a linear light source (e.g., by the laser beam passing through the transparent line opening at the light output end of the tool 400), the structure of the tool 400 can be designed to reduce separation force between the tooltip and the cured part.

The tooltip 400 should have smaller or no separation force between newly cured (printed) line segments and the tooltip. The ideal case is that the newly cured line segment will detach from the tooltip and attach to the previous line segment, in such way that the 3D object can be continuous fabricated. The tooltip coating material has a significant influence on the separation force, and the tooltip with Teflon film has the smallest separation force among various tooltip coatings that have been tested. Furthermore, Teflon can provide a long lifetime for the tooltip 400.

Referring to FIG. 4B, in addition to the coating, the two sides 420, 422 can be offset from each other in the vertical direction to create an angled curing region along the line of the tooltip 400. Through testing, some characteristics of tooltip design have been identified that can facilitate 3D printing. To provide a large space of fabrication direction, $\theta_l$, $\theta_r$ should be small, but not so small that the strength of the output end of the tooltip 400 is compromised. In some implementations, these angles are between 30 and 45 degrees. In other implementations, these angles are between 30 and 70 degrees. Note that rather than using only plastics for the tooltip 400, some implementations can include one or more metals, such as aluminum or steal, which can support larger angles.

The opening gap size, d, can be designed to pass the laser beam, and also physically regulate the laser beam size if gap size is smaller than the laser spot size (i.e., the gap can play the role of an aperture). In some implementations, a gap size, d, of 0.5 mm can largely reduce the diffraction of the laser beam and generate a better surface finish on the workpiece being manufactured. In other implementations, the opening gap size, d, is larger than the laser spot size, in which case the 3D printing resolution in the x-y plane is determined by the spot size, rather than the width of the linear opening.

Further, due to the light scatter at the opening, the main body of the tooltip 400 can be designed to absorb the scattered light (e.g., the tooltip 400 can be painted with black ink). Finally, to make the detach easier and to avoid ruining the cured part, the gap can be angled (i.e., as a result of the non-symmetry of the two sides 420, 422). In some implementations, this angle, $\theta$, is between 1 and 60 degrees or 45 degrees. In some implementations, this angle, $\theta$, is between 5 and 20 degrees. In other implementations, this angle, $\theta$, is kept at zero degrees.

As noted above, various implementations can include software programmed to perform tasks in a 3D printer. In some implementations, software can be programmed to define tool paths in accordance with the detailed structures of the tooltip 400. The tool path for the CNC accumulation is important in order to develop the process. In some implementations, an intuitive algorithm can be applied to generate the tool path for the line-based CNC accumulation process. The key idea is to slice the model into a set of layers, and then further to slice each layer into a set of line segments, which could be the input in order to control an input laser beam to cure liquid resin. What follows is a representation of a detailed algorithm for use with an STL (STereoLithography) file:

```
Input: STL file, layer thickness dz, laser scan line gap dx
Output: Tool path for laser
    z ← STL.z_Min
    // move z axis to STL.z_Min
    While (z <= STL.z_Max)
        Intersection Between plane z and STL, and obtain the contours {C_j}
        for this layer L_z
        x ← L_z · x_Min
        While (x <= L_z · x_Max)
            Empty point list {p_n}
            For C_j in {C_j}
                For adjacent two points C_j · p_k and C_j · p_{k+1} in the C_j
                Intersection Between line y and vector < C_j · p_k, C_j · p_{k+1} >,
```

```
    obtain, and push the intersection point, if any, to {p_n}
    END
        Sort {p_n} with the comparer p_{n1} < p_{n2} iff p_{n1} · y < p_{n2} · y
        // Rotation gyro mirror
        // Laser turn on with odd numbered points, and turn off with
        even numbered points
        x ← x + dx
        // move x axis to x
    END
    z ← z + dz
    // move z axis to z
END
```

Figure 5A:
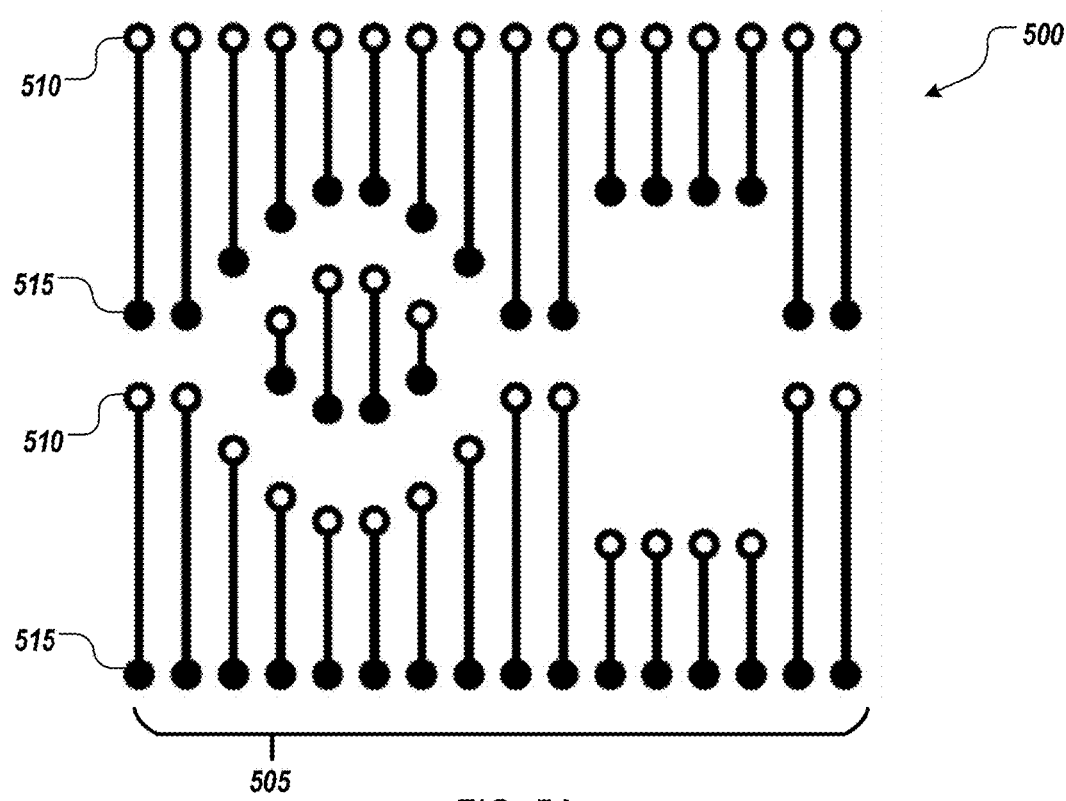
FIG. 5A shows an example of a tool path defined for a linear output of a tooltip.

To further elucidate this algorithm, FIG. 5A shows an example of a tool path 500 defined for a linear output of a tooltip. As shown, the tool path 500 for a layer includes many linear locations 505. Further, each of these linear locations 505 can include one or more on positions for the laser and one or more off positions for the laser. For example, a first of the linear locations 505 (on the left and corresponding to a first placement of the tooltip) includes two laser on positions 510 and two laser off positions 515. Thus complex and detailed objects can be built by programming a combination of tooltip locations and orientations with on/off commands for the light used to cure the photoactive resin.

Figure 5B:
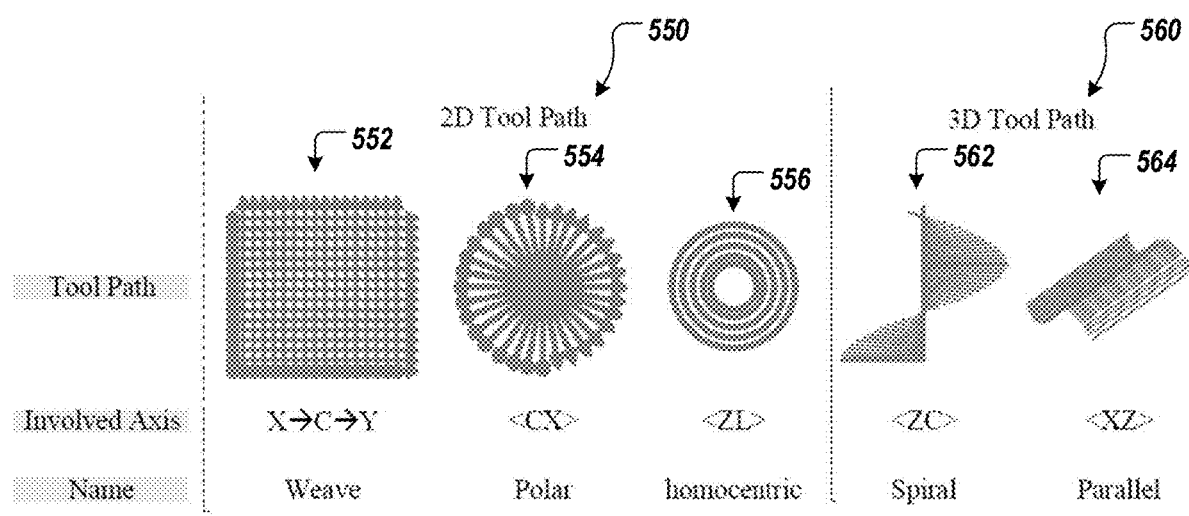
FIG. 5B shows examples of complex tool paths.

Furthermore, in combination with a multi-axis platform, the tooltip can scan along a more complex tool path. Incorporating different axis (X,Y,Z,A,B,C,L) jointly and sequentially, the CNC tooltip can follow several novel tool paths. Note that XYZ refers to translation motions in three spatial dimensions, ABC refers to rotation motions about the three spatial dimensions, and L refers to laser scanning. FIG. 5B shows examples of complex tool paths. These include 2D tool paths 550, which lie entirely within one slice of a 3D model being built. The 2D tool paths 550 can include a weave tool path 552, a polar tool path 554, and a homocentric tool path 556. 3D tool paths 560 can also be created, which are not limited to a 3D model being sliced into distinct layers.

The 3D tool paths 560 can include a spiral tool path 562 and a parallel tool path 564. Note that these are just two examples, and in some implementations, any suitable combination of rotation (spiral) and transition (parallel) along X, Y, Z axis is feasible (the rotation along X, Y, Z axis is called A, B, C, respectively). In realizing the spiral tool path, two axes (Z and C) can be involved, e.g., the C axis is constantly rotating while the Z axis is continuously lifting up. When the C axis rotates 360 degrees, one layer is formed. As for the parallel tool path, the tooltip is not only moving in a single plane, but also moving along a non-planar surface. In order to realize the parallel tool path, the transition axes (e.g., X and Z) are moving simultaneously. It will be appreciated that many other multi-axis motions of the tooltip are also possible.

In addition, tool paths can be created that improve the material properties of the workpiece being constructed by using different orientations in the curing of resin. For example, in a slice based 3D print, the orientation of the tooltip relative to the workpiece can be rotated (the tooltip, the part, or both can be rotated) to create isotropic properties in the workpiece, such as rotating the workpiece every one or two layers to improve the strength of the workpiece.

In some implementations, to formally record the tool path for CNC accumulation, Accumulation Code (A Code) is introduced based on the traditional G Code for CNC machining. In an example of a process, several commands can be added in the A Code, which include:

L: stands for Laser motion The numbers followed by "L" indicates the position of laser spot.
    M03: stands for laser on;
    M05: stands for laser off.

The main idea of A Code is to regard the laser as a normal moving axis with laser on/off. An example of A Code for a test part is shown as follows:

| Line | Code | Description |
| --- | --- | --- |
| N1 | G21 G90 | Mm units. Absolute mode |
| N2 | G00 Z0.2 | Move Z up with one layer thickness |
| N3 | G00 X0 | Rapid position: Move X to home |
| N4 | G01 X0 F3 | |
| N5 | M05 G01 L8.40519 F0.09 | Turn off laser, and move laser to line start point |
| N6 | M03 G01 L7.59481 F0.09 | Turn on laser, and scan the first segment |
| N7 | M05 | |
| ... | ... | ... |
| N43 | M05 | |
| N44 | G01 X2 F3 | Move x to next line position |
| N45 | M05 G01 L13.2888 F0.09 | |
| N46 | M03 G01 L8.92986 F0.09 | Turn on laser, and scan the first segment |
| N47 | M05 G01 L8.6813 F0.09 | |
| N48 | M03 G01 L7.3187 F0.09 | Turn on laser, and scan the second segment |
| N49 | M05 G01 L7.07014 F0.09 | |
| N50 | M03 G01 L2.71121 F0.09 | Turn on laser, and scan the third segment |
| ... | ... | ... |
| N403 | M05 | End of one layer |
| N404 | G00 Z0.4 | Move Z to next layer |
| N405 | G00 X0 | Begin to build this layer |
| N406 | G01 X0 F3 | |
| N407 | M05 G01 L8.40519 F0.09 | |
| N408 | M03 G01 L7.59481 F0.09 | |
| N409 | M05 | |
| ... | ... | ... |

In some implementations, an A Code interpreter can be designed and implemented in software. The laser scanning commands can be synchronized with the linear motions of the XZ stages. The motion commands can be delivered to a multi-axis motion controller, and the laser scanning commands can be interpreted as laser on/off signal and the gyro mirror rotation motion.

Figure 6A:
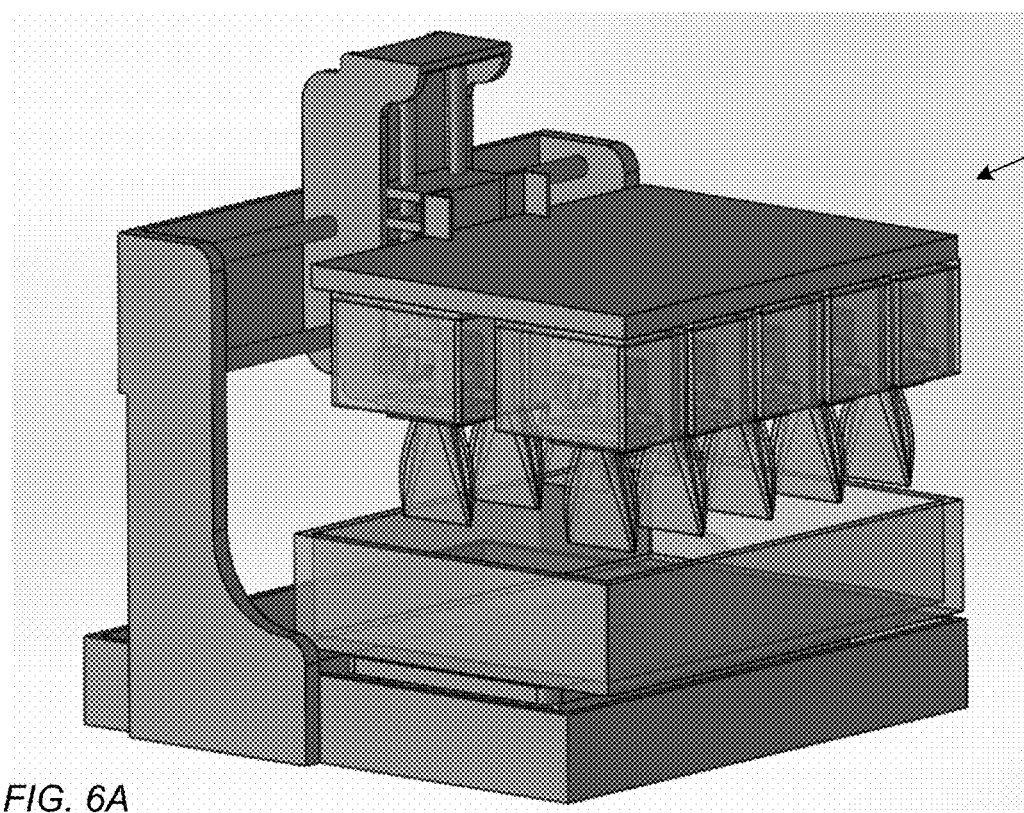
FIGS. 6A & 6B show examples of 3D printer systems using multiple scanning units.
Figure 6B:
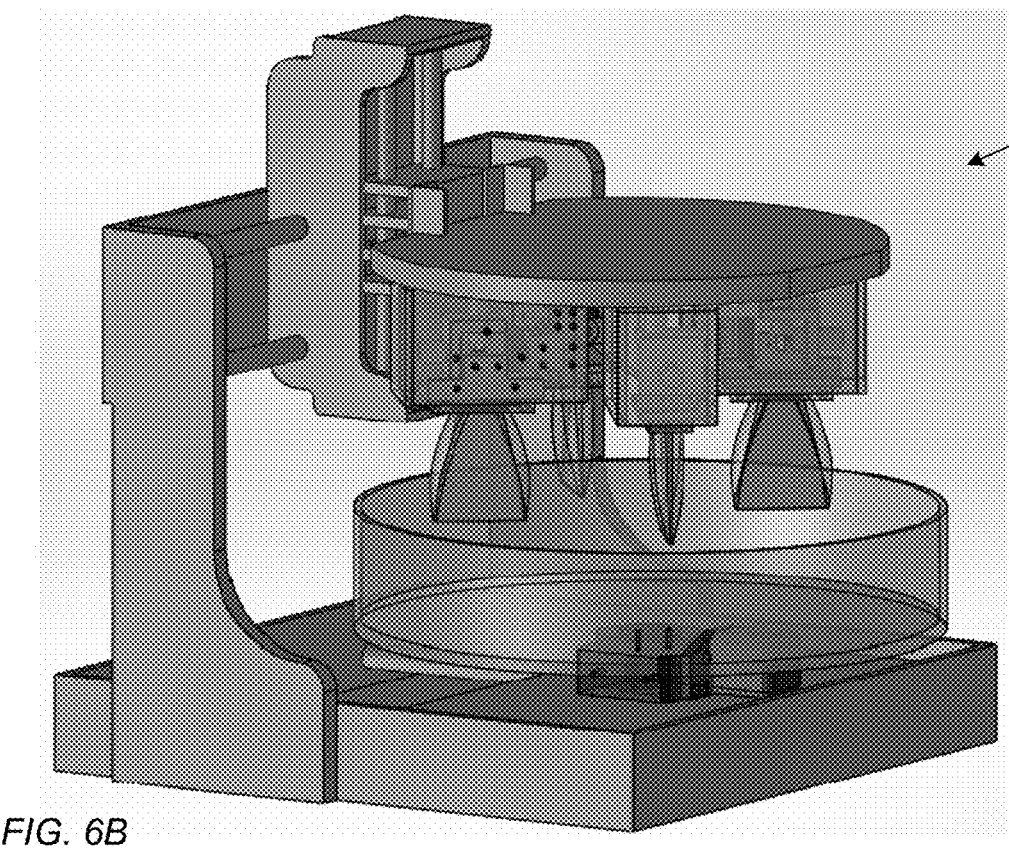

In addition, the disclosed process can be extended to have more accumulation tools. For example, FIG. 6A shows a 3D printer system 600, which is based on linear motion in X, where the system 600 includes ten scanning units, each with its own linear output tooltip. The 3D printer system 600 can achieve two times larger building space and five times faster speed by integrating ten line-based accumulation tools as described. As another example, FIG. 6B shows a 3D printer system 650, which is based on rotation motion (e.g., continuous rotation), where the system 650 includes four scanning units, each with its own linear output tooltip.

Other variations of the systems and techniques described herein are also possible. For example, the linear output of the tooltip need not be a straight line as shown. The linear nature of the output end of the tooltip relates to the narrow width as compared to the length of the opening for the light. Thus, the linear output can include one or more curves or angles. In some implementations, the linear output can have an S shape, a C shape, an L shape, or an O shape. Moreover, a single tooltip can include more than one linear opening, such as a dashed line.

Figure 7A:
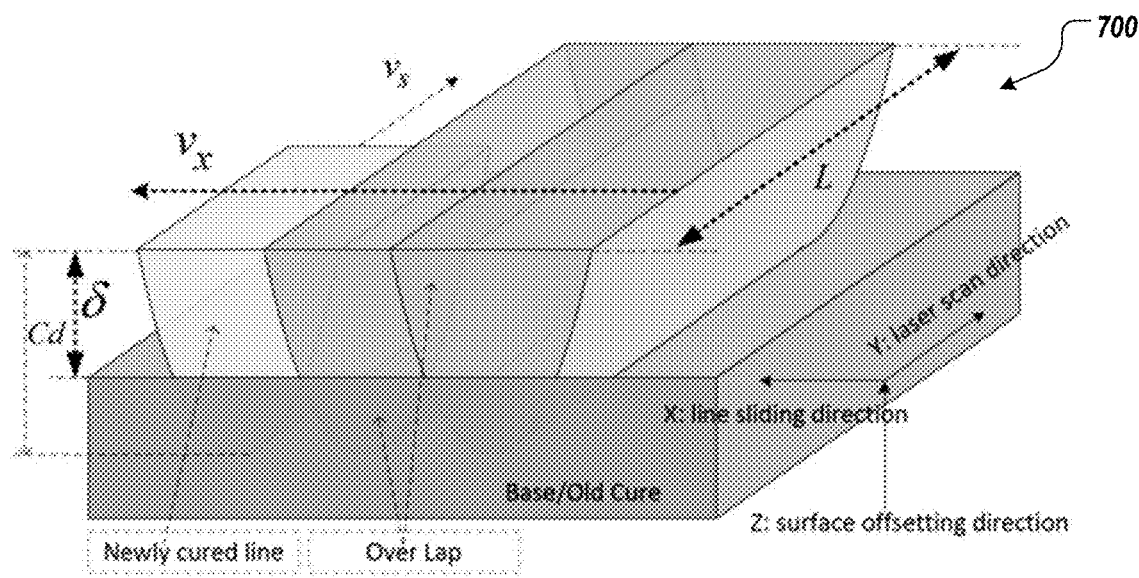
FIG. 7A shows a part accumulation model.

Regardless of the shape of the line, the systems and techniques of the present application fabricates an object line by line. Accordingly, a line-based material accumulation model can be used to analyze the developed additive manufacturing (AM) process. FIG. 7A shows such a model 700. As shown, suppose the fabricated object is accumulated line by line in the Y direction (i.e., the laser scan direction) at a speed of $v_y$, and the lines pile up along the X direction (i.e., the tool moving direction) at a speed of $v_x$. After one layer is finished, the tool tip will move up to a new layer with certain layer thickness $\delta$. The line-scanning process will be repeated to accumulate another layer.

The cure depth in the SLA process can be modeled as $$c_d(t) = D_p \ln\left(\frac{E}{E_c}\right),$$

where $D_p$ is the depth of penetration of resin, E is the input energy exposure, and $E_c$ is the critical energy of the photocurable resin. Both $D_p$ and $E_c$ are material-related properties. By adjusting E, the cure depth can be controlled. This equation is a general principle that can be applied to the photocurable resin solidification. The photocuring in the linear process also follows the equation, and a key issue is to identify the equivalent exposure energy E.

Assume the laser diode used in the system can uniformly output energy during the fabrication process. When the tool tip moves at a constant speed and the gap between two neighboring lines is smaller than the laser beam width, the energy exposure for the whole layer is uniform. Assume the laser power is denoted as $\phi$, which is in the unit of mJ/s. With the assumption that the photo flux are uniformly deposited to the whole layer, the equivalent energy exposure is total energy $\phi t$ divided by the area of whole layer ($L*v_x t$), i.e., $$E = \frac{\phi t}{Lv_x t} = \frac{\phi}{Lv_x},$$

where t is the fabrication time for a layer, L is the length of linear light source, and $v_x$ is the moving speed of linear light source. Thus, the cure depth of the process is:

$$c_d = D_p \ln\left(\frac{\phi}{E_c Lv_x}\right).$$

To guarantee the newly cured line segments can attach to the previous layers, the layer thickness should be smaller than the cure depth, which can be defined as:

$$\delta = \eta_\delta c_d,$$

where $\eta_\delta$ is an effective coefficient considering the overlap between two layers ($0<\eta_\delta<1$). As shown in FIG. 7A, the fabrication speed can be formulated as:

$$\text{speed} = v_x L \delta = v_x L \eta_\delta c_d = v_x L \eta_\delta D_p \ln\left(\frac{\phi}{E_c Lv_x}\right) = \eta_\delta D_p Lv_x \ln\frac{\phi}{E_c Lv_x}$$

This equation provides a general formula to calculate the fabrication speed related to the linear light delivery parameter settings. The process parameters includes linear light source ($\phi$, L), material property ($E_c$, $D_p$), light source moving speed $v_x$, and part quality ($\eta_\delta$). Among the parameters, the light source moving speed can be dynamically adjusted and controlled. Hence, we can derive the optimal light source moving speed as $$\hat{v}_x = \underset{v_x}{\text{argmax}}(\text{speed}) = \underset{v_x}{\text{argmax}}\left(\eta_\delta D_p Lv_x \ln\frac{\phi}{E_c Lv_x}\right) = e^{-1}\frac{\phi}{E_c L}$$

and the corresponding maximum fabrication speed is $$\text{speed}_{max} = e^{-1}\frac{\eta_\delta D_p \phi}{E_c}.$$

This result indicates that the maximum fabrication speed is linear with the input laser power. From this point of view, the process is to restrict the input photon distribution from 2D mask image to one dimensional line. Similarly, compared with the laser-based SL process, the linear process extends the spot distribution of the input photon into line distribution. In such a way, the linear curing process can achieve a good balance between fast building speed and high flexibility of moving accumulation tools. It can also enable multiple-axis fabrication processes, as discussed above.

Based on the speed equation above, the following methods can be used to increase the fabrication speed: (1) increase the power rate $\phi$, which will increase the fabrication speed linearly; (2) increase the depth of penetration of resin $D_p$; (3) decrease the critical exposure dosage $E_c$; and (4) increase the effective coefficient $\eta_\delta$. However, increasing the fabrication speed may decrease geometry resolution and one or more mechanical properties.

In the linear curing process, the resolution along each fabrication direction is related to the fabrication speed. As shown in the following table, the laser scanning resolution is $v_s*dt$, where $v_s$ is the laser scan speed, and dt is responding time for laser to switch ON/OFF.

| Direction | Resolution |
| --- | --- |
| Laser scan resolution | $v_s * dt$ |
| Gap between lines | $\phi/(eE_c v_s)$ |
| Layer thickness | $\eta_\delta D_p$ |

Resolution on each direction with maximum fabrication speed.

When increasing power rate $\phi$ and decreasing the critical energy exposure $E_c$, the gap between two successive lines will enlarge. Similarly, larger penetration depth yields higher fabrication speed; however, it will also lead to larger layer thickness.

As detailed above, cure depth is directly related to three factors: laser power, moving speed of light source, and length of light source. When the parameter settings are moved toward smaller length of light source and lower moving speed, the largest cure depth results. Likewise, when the parameter settings are moved toward longer light source and faster moving speed, the smallest cure depth results. In addition, lower moving speed and smaller length of light source will generate larger cure depth. In view of this, a cured depth model can be established for a given 3D printer configuration, and this cured depth model can then be used to predict the curing performance and to adjust the process parameters. An advantage of this approach, is that the model can explicitly express the curing characteristics using the length and speed of linear light source, which is the basic building element of the linear curing process. The model can also be generalized to the scenarios of using variable scanning and moving speeds.

Moreover, the linear process described is designed to concurrently cure liquid resin, refill additional resin, and to separate the cured line segments from the tool tip. Consequently, the extra separation and recoating time can be eliminated. In addition, the separation force in the linear process is greatly reduced when compared with the projection-based SL process. In the linear process, two kinds of separation motions may exist in order to detach the cured part from the tool tip. One separation motion occurs when sliding the tool tip along the X axis in the layer-based building process; and another motion is pulling the tool tip up along the Z axis during the multi-axis material accumulation process.

Figure 7B:
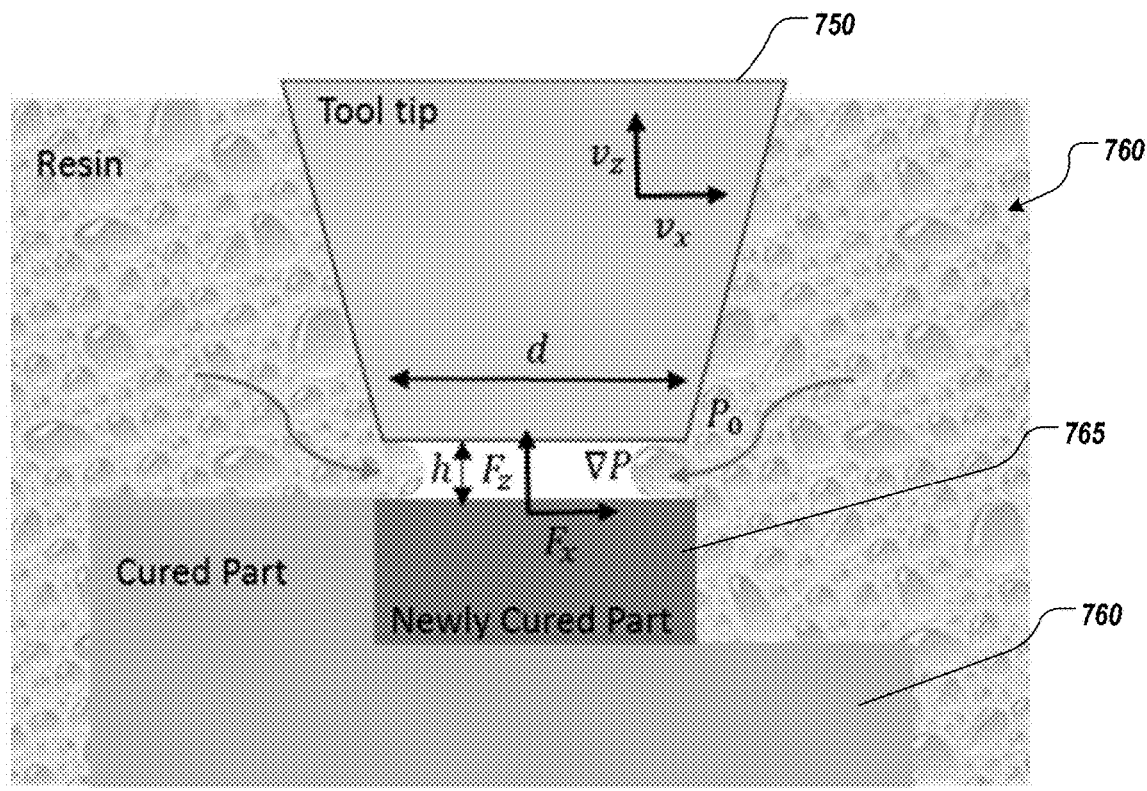
FIG. 7B shows separation forces resulting from motion of the tooltip.

FIG. 7B shows the two separation forces as $F_x$ and $F_z$, respectively, with reference to a tool tip 750 that is immersed in resin 760. During the fabrication of a layer, the tool tip 750 moves from one side to another side along the X axis. After one scan line is cured on the PDMS coating, an inhibition zone (~2.5 μm) exists between the tool tip and the newly cured part 765, which has just been added to the cured part 760. Hence when the tool tip 750 is sliding, the liquid resin in the gap will follow the movement. Thus, the sliding separation force $F_x$ can be modeled as the friction between the resin and the sliding tool tip as:

$$F_x = \mu \frac{v_x}{h} A$$

where μ is the dynamic viscosity of resin, $v_x$ is the slicing speed of the tool tip, h is the inhibition zone between the tool tip and the newly cured part, and A is the contact area. This equation shows that the slicing force is proportional to contact area A. Because at any building moment, only the newly cured line is contacting the tool tip 750, the contact area in the linear process is the line opening width×the line opening length (e.g., 0.4 mm×50 mm). This area is less than 1% the contact area of a mask projection image (e.g., 50 mm×50 mm) in other SL processes. Therefore, the sliding separation force in the linear process is largely reduced.

When the tool tip 750 moves up in the Z axis for non-layer-based motions, it generates a pulling up separation force $F_z$. As shown in FIG. 7B, the force is a suction force that drives the resin to flow into the gap between the tool tip and the cured part. The Hele-Shaw flow can be used to model this pulling up separation. As the flow is symmetric, we can only consider the right side flow. The pressure driven flow can be quantified as $$Q = \frac{h^3}{12\mu} \frac{dp}{dx} L.$$

The flow generated by pulling up is $$Q' = L \cdot x \cdot v_z.$$

Assuming the resin is uncompressible fluid, we have Q=Q', and obtain $$dp = \frac{12\mu v_z}{h^3} x dx.$$

Integrating the pressure over the pressure field leads to:

$$p_0 - p(x) = \int_x^{d/2} \frac{12\mu v_z}{h^3} x\, dx = \frac{6\mu v_z}{h^3}\left(\left(\frac{d}{2}\right)^2 - x^2\right).$$

The total separation force is the integral of the pressure on the newly cured line $$F_z = 2\int_0^{d/2} (p_0 - p(x)) L\, dx = \frac{\mu v_z d^3 L}{h^3},$$

where, $p_0$ is the atmosphere pressure, h is the gap between cured part and tool tip, $v_z$ is the moving up speed, d and L are the width and length of the newly cured line respectively, μ is the resin viscosity. For the tooltip 750, the line width can be around 0.4 mm. The equation above shows that the separation force is a three-order relationship with the curing line width d, which means our pulling up force is only $(0.4/4)^3$=0.1% of the separation force that exists in the conventional layer-based SL process with large separation area. In summary, both the layer sliding and pulling up separation forces in the linear curing process are largely reduced. Hence the tool tip can be moved smoothly and quickly since the built line segments are continuously released from the tool tip during the fabrication process.

In addition, the nature of the tooltip enables various other improved processes for 3D printing. Note that a surface S is ruled (also called a scroll) if through every point of S there is a straight line that lies on S, which can be represented as S(u, v)=p(u)+v·r(u). This parametric representation of a ruled surface is very suitable for the linear curing process, which is a line-based additive manufacturing process. Note that in the above equation, p(u) corresponds to the position of the tooltip center, v corresponds to the laser scan, and r(u) corresponds to the direction of the tooltip. Hence, the tool path for building a ruled surface is mainly to move the tool tip along its representation. This can be done using a 5-axis CNC stage in the AM machine to move the accumulation tool such that a general ruled surface can be fabricated.

In some implementations, the ruled surface can be smoothened by the curing process since the tool tip can be tilted such that the linear light source can sweep along the sloped surface. To smoothen the sloped surface of an object, the tool tip can be moved to be parallel to the slope surface and can then be slid on it to fabricate a conformal layer on the surface. Moreover, in some implementations, the tool tip can be used to build texture on a ruled surface of a given object. The added textures can be fabricated using the same or different materials. For example, a different resin can be added to the tank, or the tooltip can be removed from the resin, and the laser can be used to ablate, discolor, or otherwise modify an optical characteristic of the object manufactured in the resin to add textures, including symbols and words (e.g., adding the text "USC Fight On" to a cone manufactured in the resin tank).

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A tooltip for an additive manufacturing machine, the tooltip comprising:
    an input end configured to receive light; and
    an output end having a first planar side with an end and a second planar side with an end, the first planar side and the second planar side being angled inward and separated by an opening in between the ends of the first planar side and the second planar side, the output end being configured to deliver the light through the opening to a workpiece on a build platform in the additive manufacturing machine and to be immersed in a liquid curable resin in a tank of the additive manufacturing machine.

2. The tooltip of claim 1, wherein the opening has a width between 0.05 mm to 2.5 mm.

3. The tooltip of claim 1, wherein the output end of the tooltip is covered at least in part with a coating that reduces an attachment force between the output end of the tooltip and material cured by the light, wherein the coating covers the opening in between the ends of the first planar side and the second planar side.

4. The tooltip of claim 3, wherein the coating comprises:
    a sealing film that covers the first planar side of the output end of the tooltip, the second planar side of the output end of the tooltip, and the opening in between the ends of the first planar side and the second planar side; and
    a film that covers the sealing film.

5. The tooltip of claim 1, wherein the opening is linear, wherein the linear opening has a length of between 5 mm and 100 mm and a width of between 0.05 mm and 2.5 mm.

6. The tooltip of claim 1, wherein the opening is linear and the first planar side is vertically longer than the second planar side, thereby creating an angled curing region along the linear opening.

7. The tooltip of claim 6, wherein the angled curing region along the linear opening has an angle between five and twenty degrees with respect to a horizontal plane.

8. The tooltip of claim 6, wherein the output end of the tooltip comprises a transparent material that fills the linear opening.

9. A system for additive manufacturing, comprising:
    a tank configured to contain a build platform and a liquid resin;
    a multi-axis motion control stage that is configured to provide at least 3 axes of motion;
    a scanning unit coupled with the multi-axis motion control stage, the scanning unit including:
    a light source configured to supply light, and
    a tooltip comprising an input end to receive the light and an output end having a first planar side with an end and a second planar side with an end, the first planar side and the second planar side being angled inward and separated by a linear opening between the ends of the first planar side and the second planar side, the output end being configured to be immersed in the liquid resin in the tank and to deliver the light through the linear opening to a workpiece on the build platform;
    a coating that covers the linear opening and that reduces an attachment force between the output end of the tooltip and material cured by the light; and
    a processor that is coupled with the multi-axis motion control stage to control movement of the scanning unit and configured to:
    immerse the output end of the tooltip in the liquid resin in the tank, and
    deliver the light through the linear opening in a set of distinct lines to cure linear portions of the liquid resin in the tank to manufacture the workpiece on the build platform.

10. The system of claim 9, further comprising:
    at least one lens to focus the light received from the light source; and
    at least one gyro mirror to direct the focused light into the tooltip.

11. The system of claim 10, wherein the at least one lens includes a plurality of lenses and the at least one gyro mirror includes:
    a first gyro mirror to direct the focused light in a first direction rotated about a first axis; and
    a second gyro mirror to direct the focused light in a second direction rotated about a second axis;
    wherein the first axis of rotation is different than the second axis of rotation.

12. The system of claim 10, wherein the processor is configured to selectively deliver the light from the light source during a single scan along the linear opening.

13. The system of claim 10, wherein the focused light is a laser and has a laser spot size, wherein the linear opening has a width between 0.05 mm to 2.5 mm.

14. The system of claim 10, wherein the light source includes a fiber optic waveguide coupled with a laser.

15. The system of claim 9, further comprising a second scanning unit coupled with the multi-axis motion control stage, the second scanning unit including a second light source and a second tooltip.

16. The system of claim 9, wherein the multi-axis motion control stage provides more than 3 axes of motion.

17. The system of claim 9, wherein the linear opening has a width of between 0.05 and 2.5 mm.

18. The system of claim 9, wherein the first planar side is vertically longer than the second planar side, thereby creating an angled curing region along the linear opening.

19. The system of claim 18, wherein the angled curing region along the linear opening has an angle between a surface of the angled curing region and a horizontal plane of the workpiece, the angle being between five and twenty degrees of arc.

20. The system of claim 9, wherein the coating is transparent and includes:
   a first film that covers the first planar side, the second planar side, and the linear opening, wherein the first film prevents the liquid resin from entering the tooltip; and
   a second film that covers the first film and reduces an attachment force between the tooltip and the liquid resin that is cured.

21. The system of claim 18, wherein the output end of the tooltip comprises a transparent material that fills the linear opening.

22. The system of claim 9, wherein the processor is configured to rotate an orientation of the workpiece on the build platform.

23. The system of claim 9, wherein the multi-axis motion control stage includes a rotation stage coupled with the build platform and configured to rotate the build platform in the tank, and the processor is configured to rotate the build platform between building a first layer and a second layer of the workpiece to vary scanning patterns.

24. A system for additive manufacturing, comprising:
   a tank configured to contain a build platform and a liquid resin;
   a multi-axis motion control stage that is configured to provide at least 3 axes of motion;
   a scanning unit coupled with the multi-axis motion control stage, the scanning unit including:
      a light source configured to supply light, and
      a tooltip comprising an input end to receive the light and an output end having a first planar side with an end and a second planar side with an end, the first planar side and the second planar side being angled inward and separated by a linear opening between the ends of the first planar side and the second planar side, the output end being configured to be immersed in the liquid resin in the tank and to deliver the light through the linear opening to a workpiece on the build platform; and
   a processor that is coupled with the multi-axis motion control stage to control movement of the scanning unit and configured to:
      immerse the output end of the tooltip in the liquid resin in the tank, and
      deliver the light through the linear opening in a set of distinct lines to cure linear portions of the liquid resin in the tank to manufacture the workpiece on the build platform.

25. The system of claim 24, wherein the multi-axis motion control stage includes a rotation stage coupled with the build platform and configured to rotate the build platform in the tank, and the processor is configured to rotate the build platform between building a first layer and a second layer of the workpiece to vary scanning patterns.

26. The system of claim 24, wherein the linear opening has a width of between 0.05 and 2.5 mm.

27. The system of claim 24, wherein the first planar side is vertically longer than the second planar side, thereby creating an angled curing region along the linear opening.

28. The system of claim 27, wherein the angled curing region along the linear opening has an angle between a surface of the angled curing region and a horizontal plane of the workpiece, the angle being between five and twenty degrees of arc.

29. The system of claim 24, further comprising:
   a lens to focus the light received from the light source; and
   a gyro mirror to direct the focused light into the tooltip.

* * * * *